United States Patent [19]

Sarris

[11] Patent Number: 5,671,865
[45] Date of Patent: Sep. 30, 1997

[54] COFFEE FILTER DISPENSER

[76] Inventor: Christopher P. Sarris, 456 Ingalls Ave., Joliet, Ill. 60435

[21] Appl. No.: 568,901

[22] Filed: Dec. 7, 1995

[51] Int. Cl.⁶ ..................................... B65H 3/00
[52] U.S. Cl. ............... 221/36; 221/40; 221/271; 221/274; 221/259; 221/282
[58] Field of Search .................. 221/33, 36, 40, 221/41, 42, 43, 56, 57, 232, 259, 261, 271, 274, 277, 282, 39

[56] References Cited

U.S. PATENT DOCUMENTS

| | | | |
|---|---|---|---|
| 2,819,817 | 1/1958 | MacKenzie et al. | 221/40 |
| 4,285,114 | 8/1981 | Underdahl | 221/259 |
| 4,674,635 | 6/1987 | Huldin et al. | 206/555 |
| 4,739,902 | 4/1988 | Joslyn et al. | 221/40 |
| 4,805,801 | 2/1989 | Knopf | 221/210 |
| 4,971,222 | 11/1990 | Rohde et al. | 221/259 |
| 5,067,627 | 11/1991 | Anderson | 221/36 |
| 5,097,984 | 3/1992 | Meisner et al. | 221/40 |

FOREIGN PATENT DOCUMENTS 343567  10/1936  Italy .................................. 221/39

Primary Examiner—H. Grant Skaggs
Attorney, Agent, or Firm—Ernest Kettelson

[57] ABSTRACT

A coffee filter dispenser to dispense individual coffee filters of the cup type from a stack, comprising a housing having a bottom wall, side walls, a rear wall and an open front wall, dimensioned to receive a stack of cup type coffee filters therein facing upside down. A friction bar is positioned to slide on tracks secured to the side walls, first in a rearward direction in which it makes initial contact with the uppermost filter in the stack to slightly raise and loosen it and then in the foreword direction to eject the loosened filter from the stack and from the dispenser. The friction bar is normally biased to its forward position by a pair of coil springs connected to respective end regions of the bar and to respective brackets extending forwardly from the forward edges of the side walls. A wire or thin cable connects the friction bar to a manually operated vertical slide mechanism adjacent the rear wall of the housing, which draws the friction bar rearwardly to initially loosen the top filter when the slide mechanism is pushed downwardly. When downward pressure on the slide mechanism is released, the springs snap the friction bar back in the forward direction to eject the initially loosed top filter with which it is in frictional engagement. A laterally extending spacer bar carried by the track members toward the rear of the housing is provided for the cable to travel over as it pulls the friction bar rearwardly, the spacer bar keeping the cable from pressing down on the stack of filters.

15 Claims, 7 Drawing Sheets

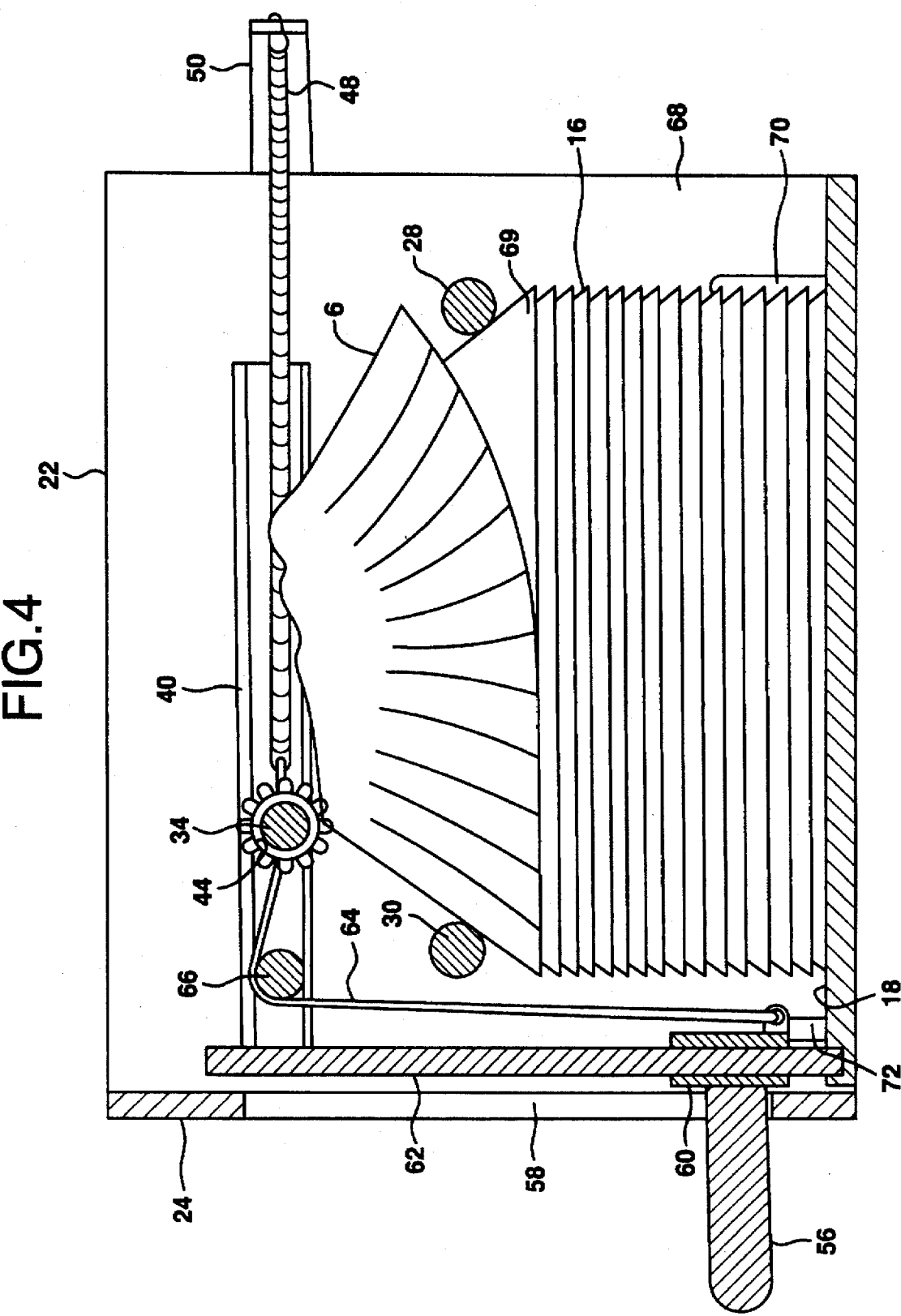

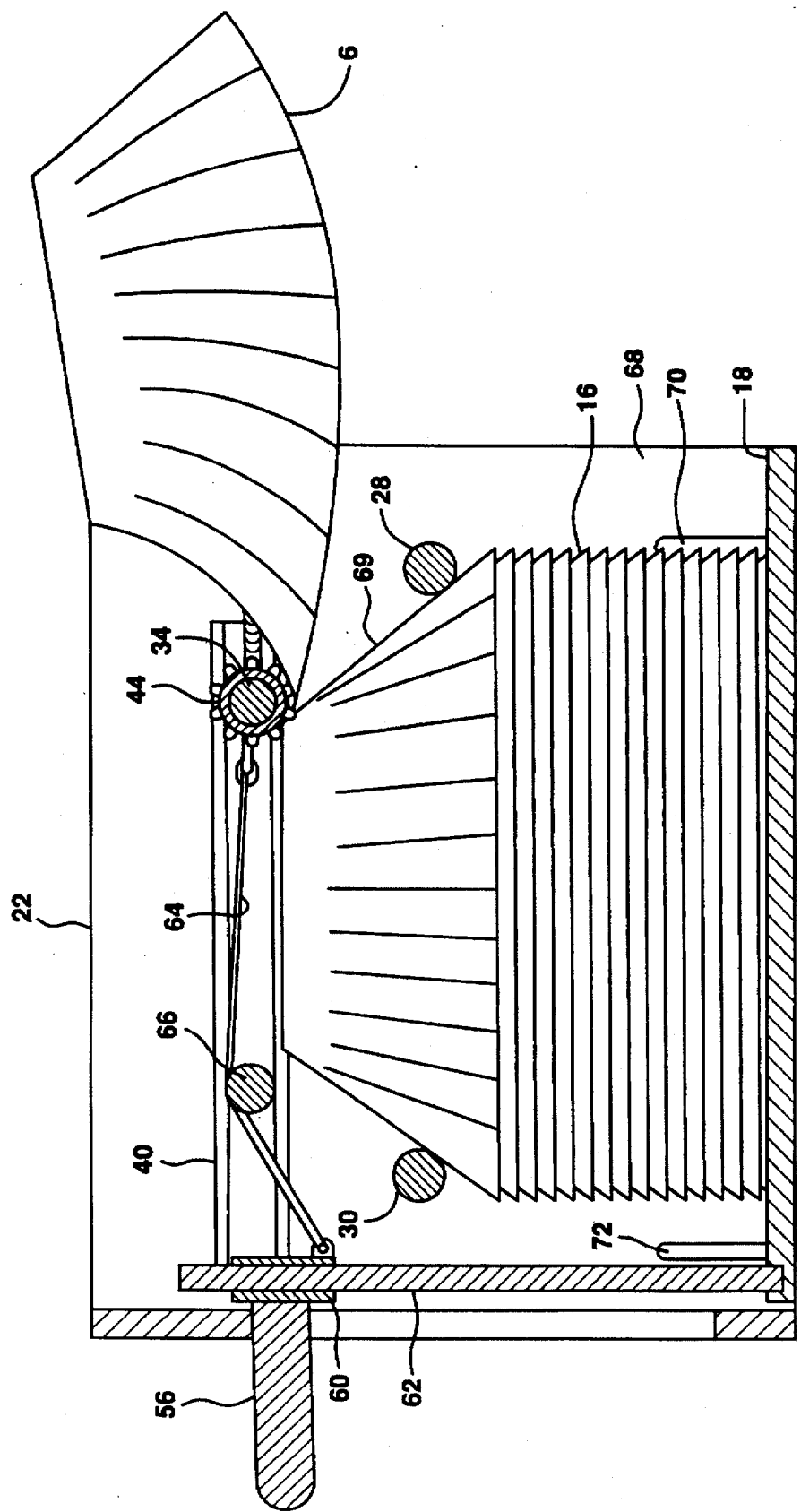

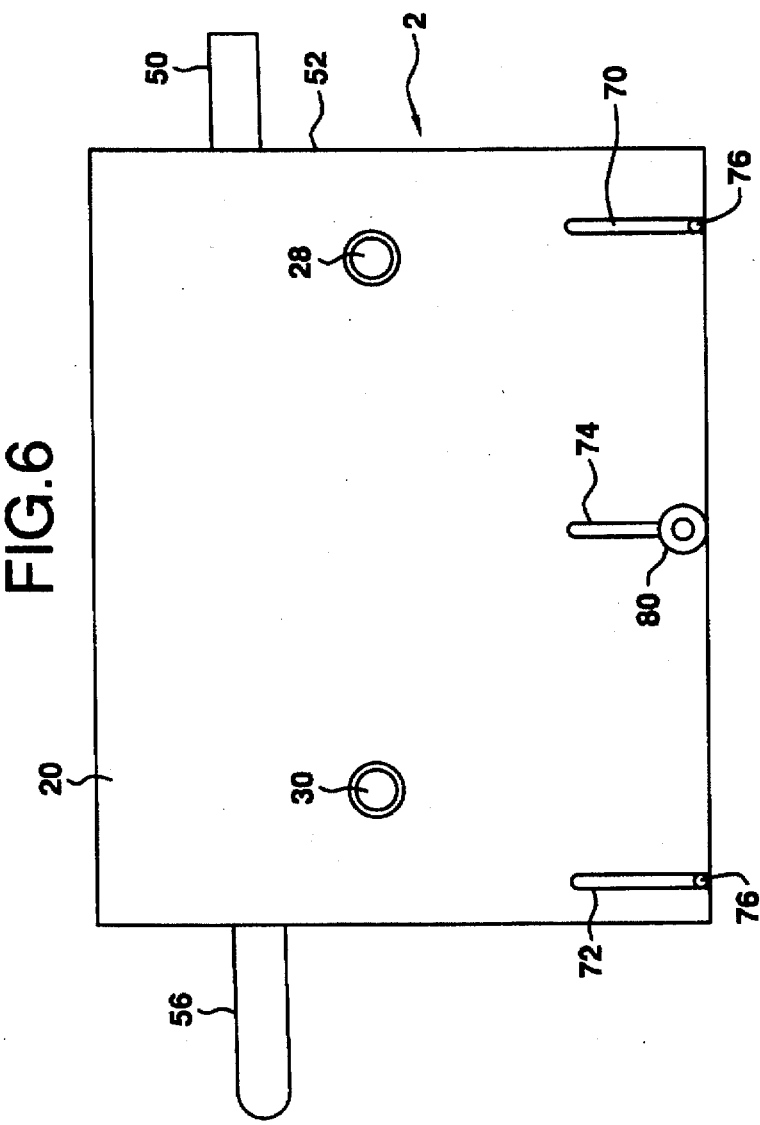
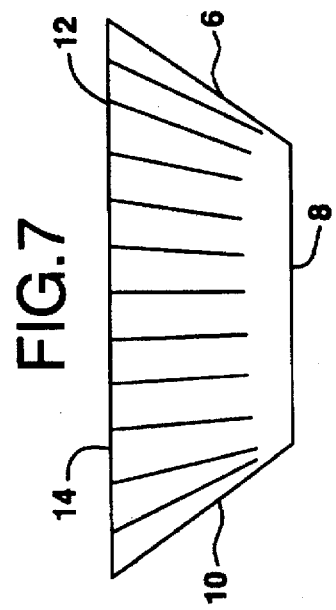

COFFEE FILTER DISPENSER

BACKGROUND OF THE INVENTION

This invention relates to a coffee filter dispenser, to dispense individual coffee filters of the cup type from a stack of such filters. Coffee filters of this type are used in automatic drip type coffee makers. The filters are made of a thin water permeable paper. They are in the form of a cup, having a flat bottom wall, a tapered circular side wall having a frusto-conical configuration, and an open top wall. The peripheral frusto-conical side wall of the filters is usually fluted or pleated. The filters are sold in packages wherein they are nested together in a stack, generally tightly packed together whereby it is difficult to remove individual filters from the stack. The present invention provides an improved solution to that problem by providing a dispenser that first loosens and partially raises the uppermost filter in the stack and then in a separate motion ejects the initially raised and loosened filter from the stack.

Prior art devices of which the inventor is aware that may have some relevance to this field of art include the following.

U.S. Pat. No. 5,067,627 discloses a coffee filter dispenser having finger grips that engage a peripheral wall portion of the top filter in a stack, the finger grips extending downwardly from the end of a vertical shaft mounted for rotation as well as for axial movement, with a crank at the upper end of the shaft to rotate and push down on the shaft which is normally biased upwardly.

U.S. Pat. No. 4,269,324 discloses a dispenser for open topped paper like containers wherein such items are placed upside down in a stack inside of a dispenser which has a rotatable finger element below the stack that engages a portion of the lowermost item in the stack when rotated and peels it away for dispensing at the bottom of the dispenser.

U.S. Pat. No. 3,871,641 discloses a sheet feeding device for feeding individual flat sheets of material from a stack comprising a block of foam material on a carrier mechanism biased toward the rear and positioned above the stack, with a handle to push the block of foam material forward to dispense the top sheet of material with which the block of foam material is in frictional contact.

U.S. Pat. No. 3,124,268 discloses a dispenser for dispensing individual folded paper towels from a stack held in a dispenser housing having an open bottom wall. A closure plate is pivotally mounted to pivot between a closed position wherein it closes the open bottom wall and toward which it is biased by spring members, and an open position wherein a portion of the lowermost paper towel in the stack drops through the open wall. When released, the closure plate springs back toward the closed position and engages the projecting portion of the lowermost paper towel moving it forwardly and outwardly for the user to grasp and withdraw from the dispenser.

U.S. Pat. No. 2,478,815 discloses a combination dispensing and bulk reducing device primarily for use in dispensing paper towels. An ejector lever is pivotally mounted to eject an individual paper towel from the top of the stack, having an ejector element at its upper end which engages the top paper towel and moves it outwardly when the ejector lever is pivoted forwardly from its rearward position to which it is normally biased.

U.S. Pat. No. 2,290,006 discloses a desk memo pad having a dispensing mechanism to push the top memo sheet in a stack forward through a slot far enough for a user to grasp and withdraw the sheet from the memo pad. The top cover portion of the pad has a separate depressible portion, biased toward the non-depressed position, which operates a lever mechanism when depressed that moves a dispensing roller toward the rear of the top sheet of note paper. When the depressible portion is released it springs back to its original non-depressed position causing the lever mechanism to bring the dispensing roller forward while a spring biases it down against the top sheet of note paper thereby sliding it forwardly from the stack far enough for a user to grasp and withdraw the sheet from the memo pad.

U.S. Pat. No. 1,719,451 discloses a bag dispensing cabinet having an elongated pick up finger pivotally mounted above and to the rear of each drawer of paper bags, having a pick-up tip portion at the outer free end of the pick up finger to slide under the folded bottom of the paper bag for raising thereof when the pick up finger pivots and moves the outer free end upwardly. A spring leaf element is provided along the upper portion of the drawer cavity which biases the pick up finger downwardly when the drawer is closed, but slides to the opposite side of the pivot pin when the drawer is opened thereby pivoting the outer end of the pick up finger and bag upwardly to be easily grasped and withdrawn by a user.

U.S. Pat. No. 1,362,058 discloses a bag dispensing cabinet comprising a drawer for a stack of paper bags, an aperture in the bottom of the drawer through which a bag engaging element projects. When the drawer is pulled outwardly, the bag engaging element extends upwardly to engage the folded over bottom of the paper bag when the drawer is again closed, whereupon the bottom portion of the lowest bag in the stack is projected outwardly through a laterally extending slot below the wall of the drawer when the drawer is fully closed.

U.S. Pat. No. 416,340 discloses a toilet paper safe in which flat sheets of toilet paper are dispensed individually from the bottom of a stack by an engaging element which projects up through a slot in the bottom of the stack chamber and frictionally engages the bottom sheet of toilet paper to slide it outwardly as the handle of a lever mechanism is pulled outwardly. The engaging element is pivoted out of engagement with the sheet of toilet paper when the handle of the lever mechanism reaches its outermost position so the user can then grasp the projecting edge of the toilet paper sheet and withdraw it the rest of the way freely.

SUMMARY OF THE INVENTION

The coffee filter dispenser in accordance with the present invention provides improvements over the prior art. It first loosens and slightly raises the uppermost filter from the stack in which all of the filters are usually packed together very tightly. This makes it possible for the next operation of the dispenser to more readily succeed in ejecting the filter from the dispenser.

The invention provides a dispenser housing in which a stack of coffee filters of the cup type are placed in their upside down or inverted position for dispensing the uppermost filter from the stack.

A laterally extending friction bar or ejecting bar is mounted on a track or guide rails for sliding movement over the top of the stack at a level wherein the frictional element of the ejecting bar engages the upwardly facing bottom wall of the uppermost filter at its forward edge when the ejecting bar is moved rearwardly. The forward portion of the bottom wall of the top filter in the stack is thus caused to crinkle as it is frictionally moved rearwardly while the rearward portion of such upwardly facing bottom wall of the filter remains stuck to the stack. This causes the forwardly facing portion of the peripheral side of the cup type filter to begin to rise and separate from the filter next below. When the ejection bar in frictional engagement with the upwardly facing bottom wall of the uppermost filter is moved rearwardly far enough to reach the most rearward portion of the bottom wall of the rest of the filters in the stack, the bottom wall of the uppermost filter is completely loosened from the bottom wall of the next adjacent filter below.

The friction or ejection bar is then moved forwardly while in frictional engagement with the now loosened and slightly raised uppermost filter whereupon it is carried forward for complete separation from the stack and for ejection from the dispenser.

The bottom wall or floor of the dispenser is adjustable upwardly and downwardly to position the uppermost filter in the stack at the proper level for the ejection bar to frictionally engage the upwardly facing bottom wall of the uppermost filter in the stack. As filters are dispensed from the stack, the stack becomes shorter. The bottom wall can then be raised to position the top filter of the shortened stack at the proper level.

A number of filters can be dispensed from a stack however before any upward adjustment of the bottom wall is required. The cup type filters are packed so tightly together in the stack that when the top one is loosened and removed, the stack tends to decompress slightly whereby the next filter in line which then becomes the top filter after the one above has been dispensed tends to rise just enough from such decompression to be at just about the same level as the dispensed filter was before it was loosened and dispensed from the stack.

The invention includes laterally extending retaining bars in front of and in back of the stack of filters to prevent the stack itself from moving forwardly and rearwardly when the ejection bar is moved forwardly and rearwardly in frictional engagement with the upwardly facing bottom wall of the uppermost filter.

The ejection bar is moved rearwardly by manual operation of an operating mechanism secured to a cable connected to the ejection bar. It is moved forwardly by the bias of coil springs which normally bias the ejection bar to its forward position.

BRIEF DESCRIPTION OF THE DRAWING

FIG. 4 is a section view taken on line 4—4 of FIG. 3, except the stack of filters are shown in side elevation.

FIG. 5 is a section view of the coffee filter dispenser substantially as in FIG. 2 with its ejection bar moved back to its normally biased forward position after having been initially moved rearward as shown in FIGS. 3 and 4, to illustrate the initially loosened top filter from the initial rearward movement of the ejection bar being ejected out from the dispenser during the return forward movement of the ejection bar.

FIG. 6 is a side elevation view of the coffee filter dispenser in accordance with this invention.

FIG. 7 is a side elevation view of a cup type coffee filter shown in its upright position.

DESCRIPTION OF PREFERRED EMBODIMENT

Figure 1:
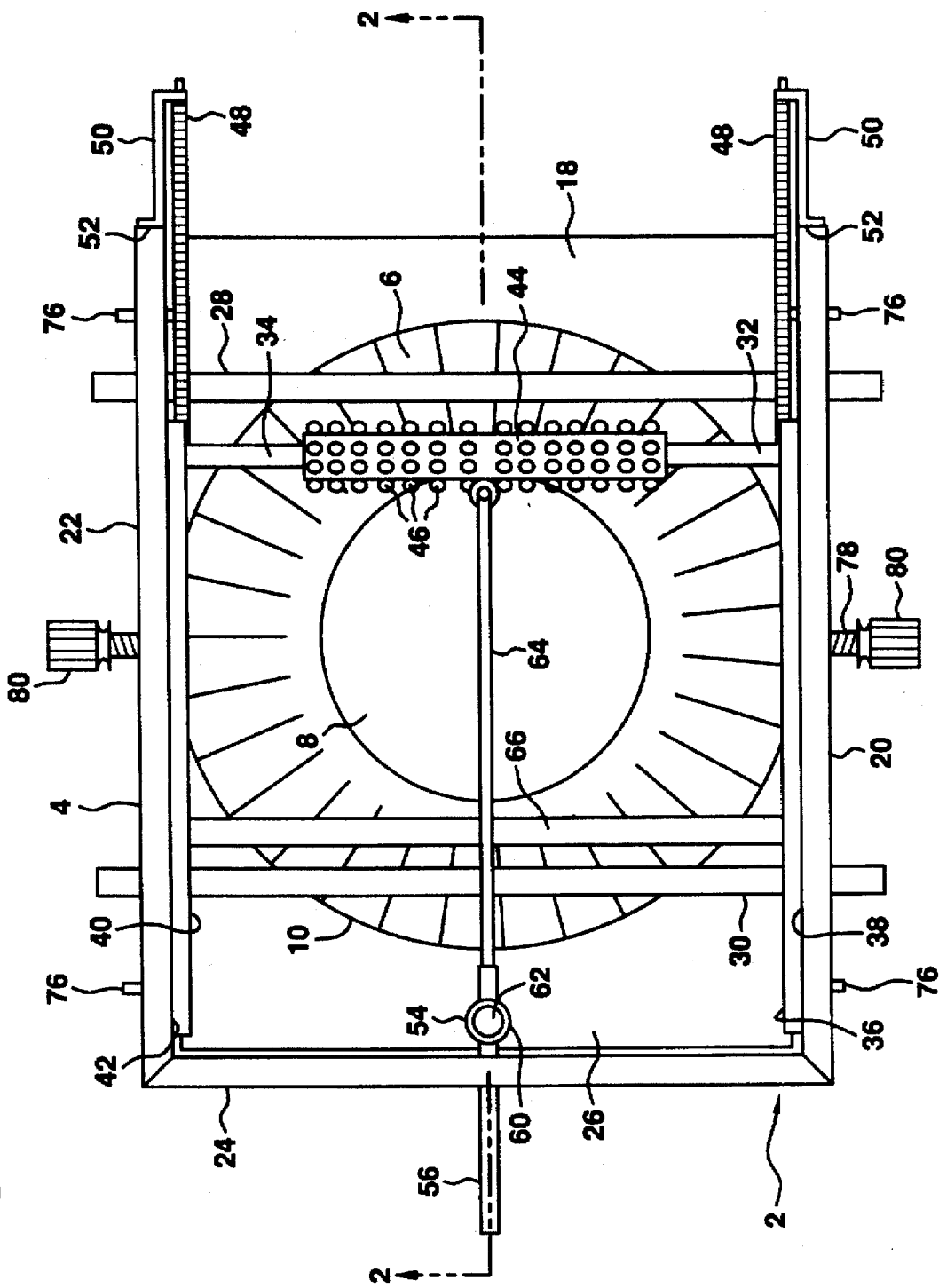
FIG. 1 is a plan view of a coffee filter dispenser in accordance with this invention showing the ejection bar in its normally biased forward position over the forward portion of a stack of filters.
Figure 2:
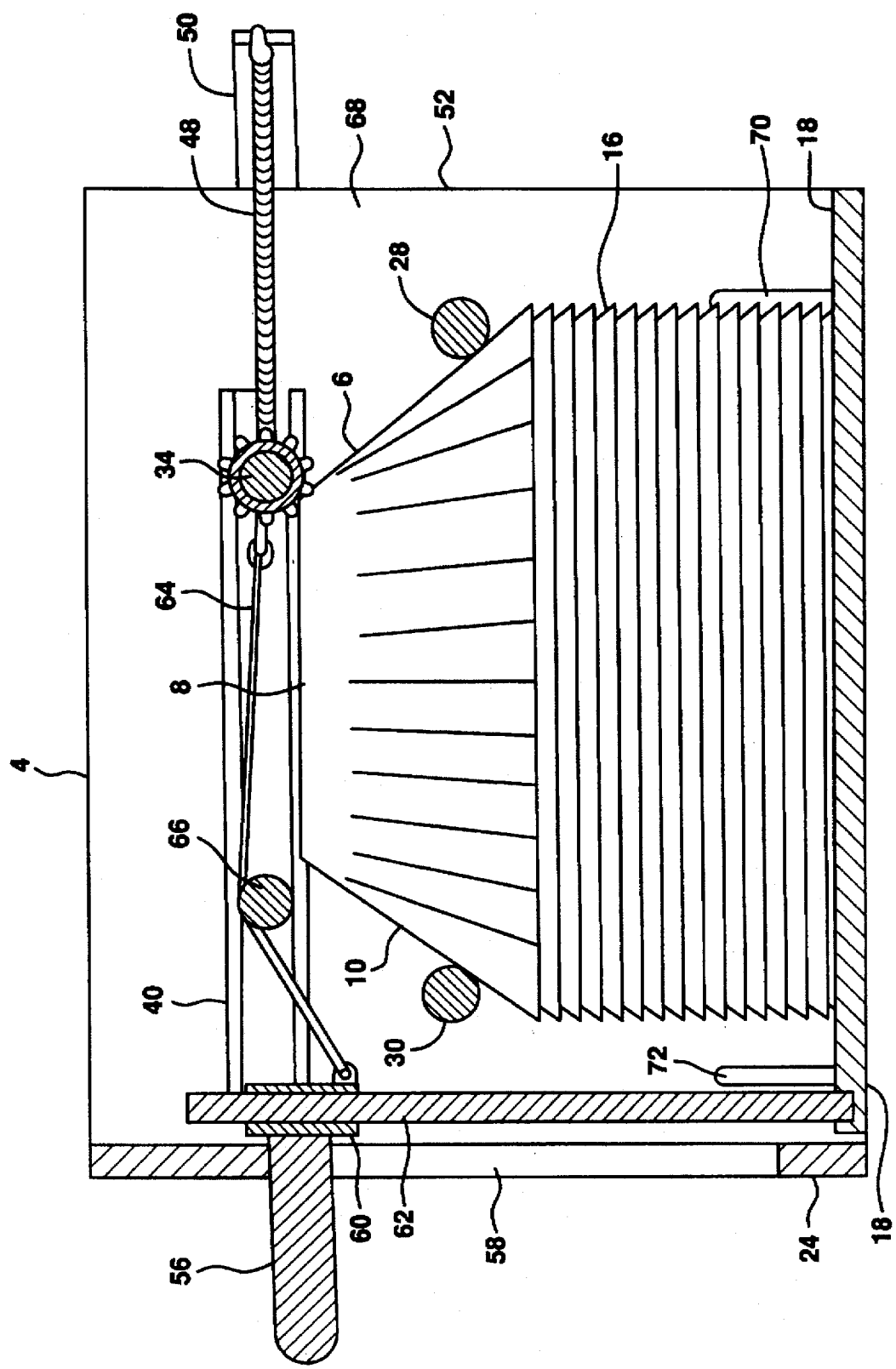
FIG. 2 is a section view taken on line 2—2 of FIG. 1, except the stack of filters are shown in side elevation.
Figure 3:
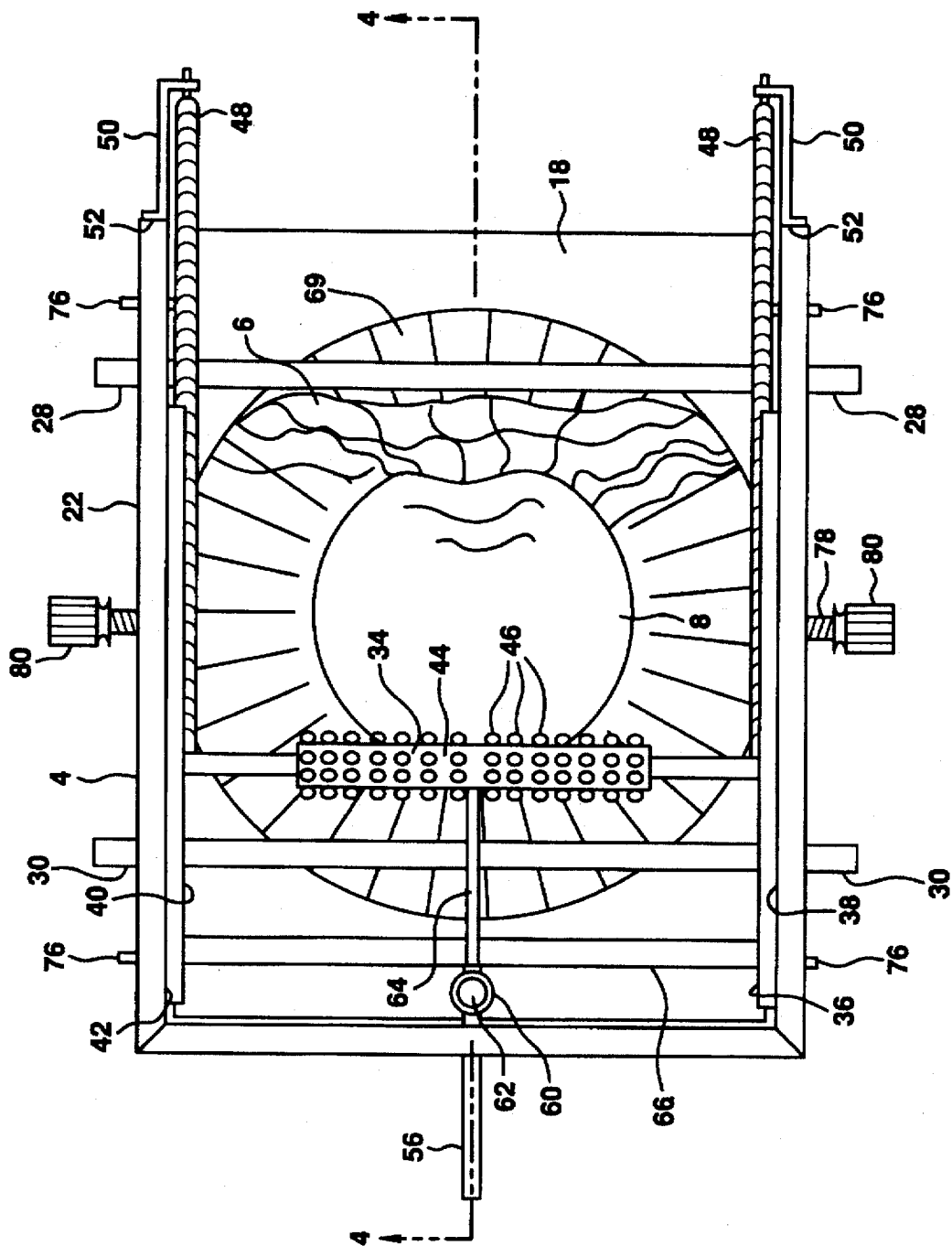
FIG. 3 is a plan view of a coffee filter as shown in FIG. 1, but with the ejection bar moved to its rearward position and with the top filter shown with its forward portion crinkled and slightly raised as a result of the rearward stroke of the ejection bar to initially loosen the top filter from the stack.
Figure 8:
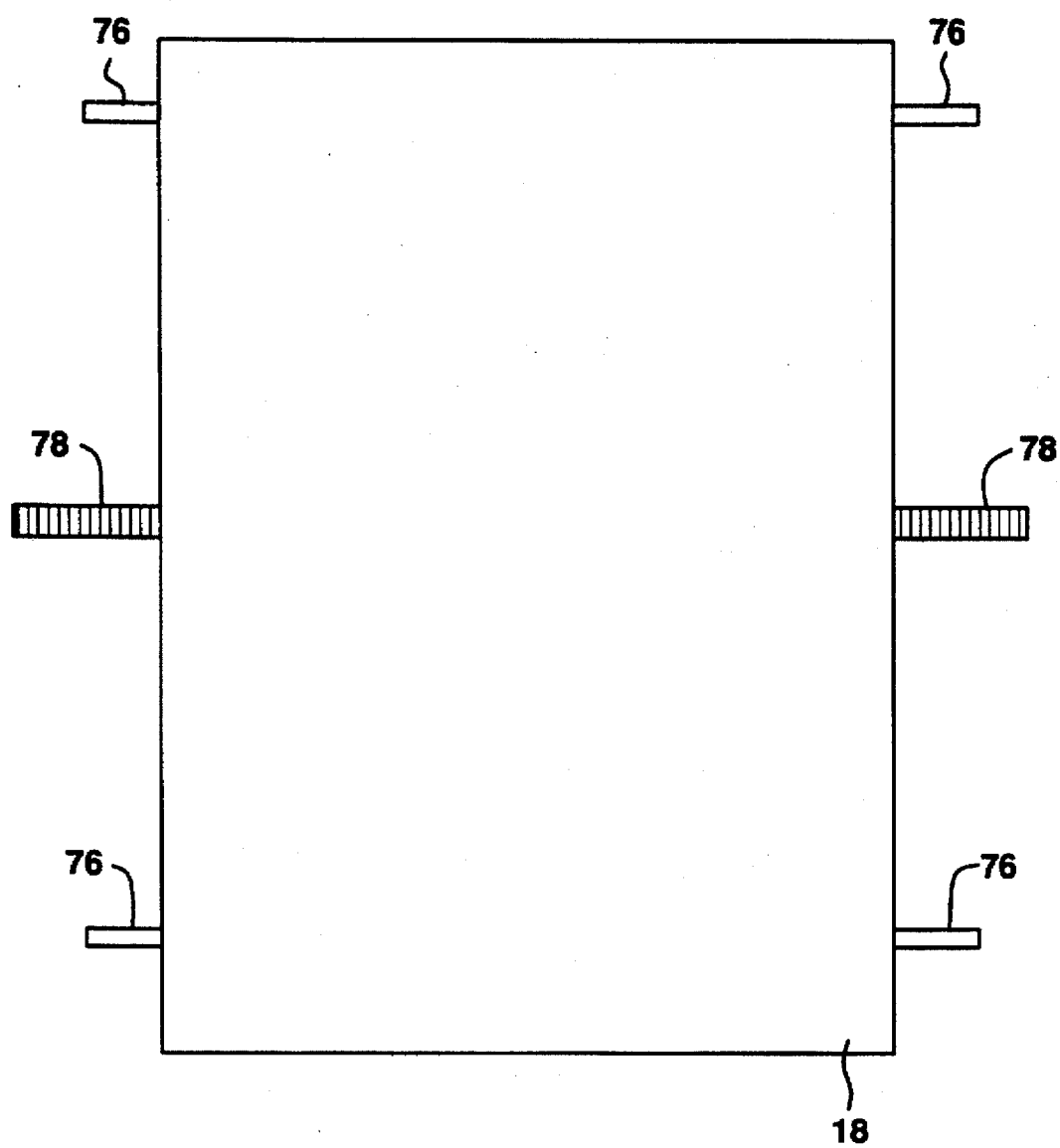
FIG. 8 is a plan view of the height adjustable floor or bottom wall of the coffee filter dispenser in accordance with this invention.

A coffee filter dispenser 2 in accordance with this invention comprises a housing 4 to receive coffee filters 6 of the bucket or cup type having a bottom wall 8 of water permeable filter paper or the like, an outwardly flared and fluted peripherally extending circular side wall 10 of the same material and on open top wall 12 to receive ground coffee beans in the cavity 14 of the filter and for heated water to drip therein when the coffee filter 6 is in position for use in a coffee maker.

A stack 16 of coffee filters 6 is received upside down in the dispenser 2, with the open wall 12 of the filters 6 facing downwardly toward the bottom wall or floor 18 of the dispenser housing 4. The housing 4 includes a first side wall 20 extending upwardly from the bottom wall 18 of the dispenser housing 4 along one side edge and a second side wall 22 extending upwardly therefrom along the opposite side edge.

A rearwardly facing end wall 24 extends upwardly from the bottom wall or floor 18 along its rearwardly facing edge between the rearwardly facing edges of side walls 20 and 22.

To hold the stack 16 of filters 6 in position within the dispensing chamber 26 of the housing 4, the side walls 20 and 22 thereof are spaced apart a distance which corresponds to the diameter of the coffee filters 6 to hold the stack 16 from side to side lateral movement. To hold the stack 16 from front to back or longitudinal movement, a forwardly positioned removable retaining rod 28 extends through apertures in side walls 20 and 22 at a vertical level which is below the upper half of the uppermost filter 6 in the stack 16 as measured from the bottom wall 18 of the housing 4, and at a forward position to contact and prevent forward movement of the stack 16 when the top most filter 6 in the stack is being lifted and moved forwardly out from the stack and over the retaining rod 28.

A rearwardly positioned removable retaining rod 30 extends through apertures in side walls 20 and 22 at a vertical level comparable to that of forwardly positioned retaining rod 28, and at a rearward position to contact and prevent rearward movement of the stack 16 when the forwardly positioned retaining rod 28 is in place to bear against and prevent rearward movement of the stack 16.

A coffee filter ejecting mechanism 32 is provided to first loosen and slightly raise the uppermost filter 6 from the stack 16 as the ejecting mechanism is moved rearwardly and to then eject such filter 6 from the stack when it is moved forwardly. The ejecting mechanism 32 comprises a laterally extending ejection rod 34 mounted for reciprocating movement forwardly and rearwardly in a first track member 36 extending front to back along the inner surface 38 of the side wall 20 and a second track member 40 extending front to back along the inner surface 42 of the side wall 22. The track members 36 and 40 are positioned at a vertical level that places the laterally extending ejection rod 34 at the vertical level which engages the upwardly facing bottom wall 8 of the uppermost filter 6 in the upside down stack 16 of filters 6 seated on the bottom wall 18 of the housing 4 when the ejection rod 34 is moved rearwardly and forwardly in the track members 36 and 40.

The ejection rod 34 includes a friction enhancing member 44 comprising a sleeve of rubber material or other friction enhancing material having a plurality of friction enhancing knurls or knobs 46 projecting outwardly from its surface to better grip the upwardly facing bottom wall 8 of the uppermost filter 6 in the stack 16 as the ejection rod 34 is passed over it both rearwardly to slightly raise from the stack and forwardly to eject.

The ejection rod 34 is biased to its forward most position by a pair of coil springs 48 secured at one end to respective opposite end portions of the ejection rod 34 and at their opposite ends to respective brackets 50 extending from the forward ends 52 of the side walls 20 and 22. At its forward most position, the ejection rod 34 is located just above and with its friction enhancing member in contact with the forward most edge of the bottom circular wall 8 of the uppermost cup-type filter 6 in the upside down stack 16.

To move the ejection rod 34 rearwardly, an operating mechanism 54 is mounted adjacent the rearwardly facing end wall 24. The operating mechanism comprises an operating handle 56 which extends outwardly from the end wall 24 through a vertically extending slot 58, having an inner end secured to a vertical slide member 60 mounted for reciprocating movement up and down on a vertical guide rod 62 between an ejection rod retracted position when moved down and an ejection rod extended position when moved up.

A thin wire or cable 64 is secured at one end to the ejection rod 34 at its mid section and at the other end to the lower portion of the vertical slide member 60. A laterally extending spacer rod 66 extends laterally between side walls 20 and 22 rearwardly of the stack 16 of filters 6 in the chamber 26 of the housing 4, having one end received in track member 36 on the inner surface 38 of side wall 20 and its other end received in the track member 40 on the inner surface 42 of side wall 22. The wire or cable 64 extends over the spacer rod 66 as it extends from its attachment at one end to the ejection rod 34 and at its other end to the vertical slide member 60. The spacer rod 66 is free to roll back and forth in the track members 36 and 40 as the operating mechanism draws the cable 64 downwardly and rearwardly over the spacer rod 66. The spacer rod 66 keeps the cable 64 above the stack 16 of filters 6 as the cable 64 is pulled downwardly by the operating mechanism 54 to draw the ejection rod 34 rearwardly to its retracted position, and to prevent the cable 64 from pressing down on the filters 6 in the stack 16.

To operate the coffee filter dispenser 2, the user grasps the handle 56 which is in its uppermost position when the ejection rod 34 is in its forwardly biased position in front of and in position to frictionally engage the bottom wall 8 of the uppermost filter 6 in the upside down stack 16 when the ejection rod 34 is pulled rearwardly. The handle 56 is then pushed downwardly which moves the vertical slide member 60 downwardly on the vertical guide rod 62 to its ejection rod retracted position. The cable 64 riding over levelling rod 66 thereby draws the ejection rod 34 rearwardly to its retracted position. As it passes over the bottom wall 8 of the uppermost filter 6 in the stack 16 in the rearward direction, the friction enhancing member 44 frictionally engages the bottom wall 8 of such uppermost filter 6 which loosens it from the stack and lifts the forward portions of the filter enough so the filter will clear the forwardly positioned retaining rod 28 and slide over it for ejection when the ejection rod slides forwardly in the ejecting direction.

After the ejection rod 34 has been drawn rearwardly to its retracted position and the uppermost filter 6 has been loosened and slightly raised from the stack 16, the user lets the handle 56 move upwardly under the bias of the coil springs 48 which have been stretched when the ejection rod 34 is pulled rearwardly. The springs 48 spring back to their original position causing the ejection rod 34 to move forwardly with its friction enhancing member 44 in frictional engagement with the initially loosened and slightly raised uppermost filter 6 in the stack. As the ejection rod moves forwardly, it moves the uppermost filter 6 forwardly and outwardly from the open front wall 68 of the dispenser 2 and over the forwardly positioned retaining rod 28 where it can then be readily grasped by the user.

The operating procedure is repeated to eject the next filter 69 in line which becomes the one uppermost in the stack after the one above it has been ejected. The bottom wall 18 of the housing 4 may be raised upwardly as the stack 16 of filters becomes shortened in its vertical dimension as more and more filters are removed. The bottom wall 18 may be raised upwardly enough to always position the uppermost filter 6 in the stack 16 at the level in which the friction enhancing member 44 of the ejection rod 34 will frictionally engage the bottom wall 8 of such uppermost filter to loosen and slightly raise it in the rearward direction and to eject it in the forward direction as described above.

To raise and lower the bottom wall 18, a forwardly positioned stabilizing slot 70 extends vertically near the forward ends of each of the side walls 20 and 22, a rearwardly positioned stabilizing slot 72 extends vertically near the rearward ends of each of the side walls 20 and 22, and adjusting slots 74 extend vertically at the mid-region of each of the side walls 20 and 22. Stabilizing pins 76 extend outwardly from the side edges of the bottom wall 18 to seat in the stabilizing slots 70 and 72. Adjusting screws 78 extend outwardly from the side edges of the bottom wall 18 at its mid-region for reception through the adjusting slots 74. Adjusting knobs 80 are threaded on the adjusting screws 78 to tighten against the respective side walls 20 and 22 to hold the bottom wall in place when it has been slidingly moved up or down with its stabilizing pins 76 in stabilizing slots 70 and 72 to the desired level that will put the uppermost filter 6 in the upside down stack 16 in position for operating engagement of the ejection rod 34 therewith.

I claim:

1. A coffee filter dispenser to dispense individual coffee filters of the cup type from a stack of such coffee filters comprising a chamber in which to receive a said stack of said coffee filters in a position wherein said cup type coffee filters in said stack are facing upside down, said chamber having a bottom wall on which to place said stack of cup type filters facing upside down, said stack having an uppermost cup type filter thereon facing upside down, said uppermost cup type filter having a bottom cup wall facing upwardly from said stack, initial loosening means positioned to engage said uppermost cup type filter in said stack to initially loosen said uppermost cup type filter from said stack, said initial loosening means being non-adherent, and ejection means positioned to engage and slidably eject said uppermost cup type filter from said stack after it has been initially loosened by said initial separating means.

2. A coffee filter dispenser as set forth in claim 1, wherein said initial loosening means includes friction engaging means movable between a non-loosening position wherein said uppermost cup type filter remains in its original stacked position in said stack and a filter loosened position wherein said uppermost cup type filter has been initially loosened in said stack, and operating means to move said friction engaging means between said non-loosening position and said filter loosened position.

3. A coffee filter dispenser as set forth in claim 1, wherein said ejection means includes friction engaging means movable between a non-ejecting position wherein said uppermost cup type filter remains in its initially loosened position after being engaged by said initial loosening means and a filter ejected position wherein said initially loosened uppermost cup type filter has been ejected from said dispenser, and operating means to move said friction engaging means between said non-ejecting position and said filter ejected position.

4. A coffee filter dispenser as set forth in claim 1, wherein said initial loosening means includes a friction engaging member movable in a first direction to engage and initially loosen said uppermost cup type filter in said stack, said ejection means includes said friction engaging member movable in a second and different direction to engage and eject said initially loosened cup type filter from said stack, including operating means to move said friction engaging member in said first and second directions.

5. A coffee filter dispenser as set forth in claim 4, wherein said operating means is manually operable and includes a handle for a user to manually grasp and move said friction engaging member in at least one of said first and second directions.

6. A coffee filter dispenser as set forth in claim 5, wherein said operating means is normally biased toward at least one of said first and second positions and includes a biasing member to bias said operating means toward said one of said first and second directions.

7. A coffee filter dispenser as set forth in claim 6, wherein said friction engaging member comprises an elongated rod positioned laterally across said chamber in position to frictionally engage a portion of said uppermost cup type filter in said stack, said chamber having a rearwardly facing wall and a forwardly facing open wall, said elongated rod being moved rearwardly in the direction of said rearwardly facing wall when moved in said first direction and being moved forwardly in the direction of said forwardly facing open wall when moved in said second direction.

8. A coffee filter dispenser as set forth in claim 7, wherein said elongated rod includes a friction enhancing member positioned thereon for frictional engagement with a portion of said uppermost cup type filter in said stack.

9. A coffee filter dispenser as set forth in claim 8, wherein said chamber includes first and second spaced apart side walls extending between said rearwardly facing wall thereof and said forwardly facing open wall thereof, a first track member along said first one of said side walls extending longitudinally between said rearwardly and forwardly facing walls of said chamber and facing inwardly thereof, a second track member along said second one of said side walls extending between said rearwardly and forwardly facing walls of said chamber and facing inwardly thereof toward said first track member, said laterally positioned elongated rod having each opposite end received in a respective one of said first and second track members for sliding movement therein in said first and second directions.

10. A coffee filter dispenser to dispense individual coffee filters of the cup type from a stack of such coffee filters comprising a chamber in which to receive a said stack of said coffee filters in a position wherein said cup type coffee filters in said stack are facing upside down, said chamber having a bottom wall on which to place said stack of cup type filters facing upside down, said stack having an uppermost cup type filter thereon facing upside down, said uppermost cup type filter having a bottom cup wall facing upwardly from said stack, initial loosening means positioned to engage said uppermost cup type filter in said stack to initially loosen said uppermost cup type filter from said stack and ejection means positioned to engage and eject said uppermost cup type filter from said stack after it has been initially loosened by said initial separating means, wherein said initial loosening means includes a friction engaging member movable in a first direction to engage and initially loosen said uppermost cup type filter in said stack, said ejection means includes said friction engaging member movable in a second and different direction to engage and eject said initially loosened cup type filter from said stack, including operating means to move said friction engaging member in said first and second directions, wherein said operating means is manually operable and includes a handle for a user to manually grasp and move said friction engaging member in at least one of said first and second directions, wherein said operating means is normally biased toward at least one of said first and second positions and includes a biasing member to bias said operating means toward said one of said first and second directions, wherein said friction engaging member comprises an elongated rod positioned laterally across said chamber in position to frictionally engage a portion of said uppermost cup type filter in said stack, said chamber having a rearwardly facing wall and a forwardly facing open wall, said elongated rod being moved rearwardly in the direction of said rearwardly facing wall when moved in said first direction and being moved forwardly in the direction of said forwardly facing open wall when moved in said second direction, wherein said elongated rod includes a friction enhancing member positioned thereon for frictional engagement with a portion of said uppermost cup type filter in said stack, wherein said chamber includes first and second spaced apart side walls extending between said rearwardly facing wall thereof and said forwardly facing open wall thereof, a first track member along said first one of said side walls extending longitudinally between said rearwardly and forwardly facing walls of said chamber and facing inwardly thereof, a second track member along said second one of said side walls extending between said rearwardly and forwardly facing walls of said chamber and facing inwardly thereof toward said first track member, said laterally positioned elongated rod having each opposite end received in a respective one of said first and second track members for sliding movement therein in said first and second directions, wherein said operating means includes an operating mechanism positioned adjacent said rearwardly facing wall of said chamber and inwardly thereof, said operating mechanism including said handle, said handle extending through an opening in said rearwardly facing wall, said operating mechanism including a vertically extending guide bar, a slide member mounted for reciprocating movement on said vertically extending guide bar between an uppermost position and a lowermost position and movable in at least one direction therebetween by said handle, an elongated connecting line connected to said slide member at one end and connected at its other end to said laterally positioned elongated rod, said connecting line drawing said rod rearwardly in said first direction to initially loosen said uppermost cup type filter in said stack when said handle moves said slide member downwardly to its said lowermost position, said biasing member including a spring connected at one end to said laterally positioned elongated rod and connected at its other end to a bracket projecting forwardly of said chamber to bias said rod forwardly in said second direction to engage and eject said initially loosened uppermost cup type filter from said dispenser.

11. A coffee filter dispenser as set forth in claim 10, including a laterally positioned spacer rod mounted for rolling movement forwardly and rearwardly in said first and second track members, said spacer rod being located rearwardly of said first mentioned laterally positioned elongated rod and forwardly of said slide member of said operating mechanism, said connecting line extending over said spacer rod to prevent being pressed downwardly on to said filters in said stack when said slide member is moved downwardly to its said lowermost position.

12. A coffee filter dispenser as set forth in claim 11, wherein said bottom wall of said chamber is adjustable to raise the level of the remaining uppermost cup type filter in the stack to that which enables said first mentioned laterally positioned elongated rod to engage said remaining uppermost cup type filter for initial loosening thereof and for ejectment thereof after the said stack has been shortened and the level of its uppermost filter lowered as a result of removing and ejecting previous filters from said stack.

13. A coffee filter dispenser as set forth in claim 12, wherein said bottom wall of said chamber is freely movable upwardly and downwardly between said first and second spaced apart side walls of said chamber, stabilizing means to hold said bottom wall of said chamber in substantially the same horizontal and angular relationship to said first and second side walls as said bottom wall of said chamber is moved upwardly and downwardly, and adjustable securing means to hold said bottom wall of said chamber at whatever level to which it is moved.

14. A coffee filter as set forth in claim 13, wherein said stabilizing means includes first vertically extending slots in each of said first and second side walls of said chamber near the forward ends thereof, second vertically extending slots in each of said first and second side walls of said chamber near the rearward ends thereof, first projecting members extending from opposite side edges of said bottom wall of said chamber near its forward end received in respective ones of said first vertically extending slots in said first and second side walls, and second projecting members extending from opposite side edges of said bottom wall of said chamber near its rearward end received in respective ones of said second vertically extending slots in said first and second side walls.

15. A coffee filter as set forth in claim 14, wherein said adjustable securing means comprises a third vertically extending slot in at least one of said first and second side walls of said chamber, an elongated securing member extending through said third vertically extending slot connected to said bottom wall of said chamber at one end and having an adjustable holding member at the opposite end of said elongated securing member movable between a holding position to hold said bottom wall of said chamber at whatever level to which it is moved and a release position to release said bottom wall of said chamber for movement upwardly or downwardly to a different desired level.

* * * * *